Figure 2A:
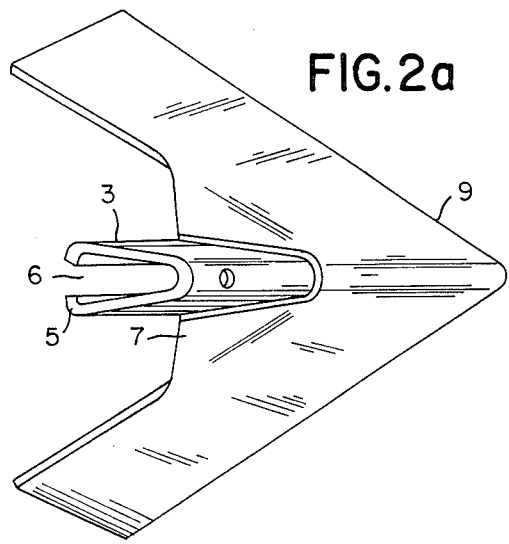

United States Patent [19]

Johnson

[11] Patent Number: 4,781,254

[45] Date of Patent: Nov. 1, 1988

[54] TWO-PIECE EARTH ENGAGING IMPLEMENT AND METHOD OF FORMING THE SAME

[75] Inventor: William M. Johnson, Melton South, Australia

[73] Assignee: Ralph McKay Limited, Maidstone, Australia

[21] Appl. No.: 948,462

[22] Filed: Dec. 30, 1986

Related U.S. Application Data

[63] Continuation-in-part of Ser. No. 637,339, Aug. 3, 1984, abandoned, which is a continuation of Ser. No. 217,170, Dec. 16, 1980, abandoned.

[30] Foreign Application Priority Data

Dec. 20, 1979 [AU] Australia ............................. PE1794

[51] Int. Cl.⁴ ........................ A01B 15/04; B21D 5/16; B21H 7/06
[52] U.S. Cl. .................................. 172/730; 29/148.3; 172/745; 172/762
[58] Field of Search ............... 172/380, 713, 719, 724, 172/726, 730, 732, 745, 747, 749, 751, 762; 29/148.3, 512; 37/141 T, 142 R; 76/101 R, 109, 113; 403/199, 244, 262, 270; D15/11, 28, 29

[56] References Cited

U.S. PATENT DOCUMENTS

| | | | |
|---|---|---|---|
| 158,375 | 1/1875 | Houston | 172/732 X |
| 499,251 | 6/1893 | Rockey | 172/380 |
| 576,615 | 2/1897 | Roesch | 172/720 X |
| 594,528 | 11/1897 | Griffiths | 172/732 |
| 1,499,531 | 7/1924 | Hoeregott | 172/730 |
| 1,639,593 | 8/1927 | Dean | 172/733 |
| 1,970,137 | 8/1934 | Harte | 76/113 |
| 2,222,071 | 11/1940 | Gustafson | 172/762 |
| 2,357,114 | 8/1944 | Howe | 76/113 X |
| 3,289,772 | 12/1966 | Blackwood | 172/730 X |

FOREIGN PATENT DOCUMENTS

| | | | |
|---|---|---|---|
| 12681/33 | 8/1934 | Australia | 172/762 |
| 22790/35 | 4/1936 | Australia | 172/762 |
| 106027 | 12/1938 | Australia | 172/762 |
| 464987 | 9/1928 | Fed. Rep. of Germany | 172/730 |
| 467905 | 11/1928 | Fed. Rep. of Germany | 172/732 |

Primary Examiner—Richard T. Stouffer
Attorney, Agent, or Firm—Christel, Bean & Linihan

[57] ABSTRACT

An agricultural earth engaging implement formed from two metal plate sections. One piece forms a narrow profile shaft and the other forms the earth engaging portion. The shaft is formed to provide a tapered cavity for receiving a tine and the implement is held on to the tine by frictional forces.

12 Claims, 3 Drawing Sheets

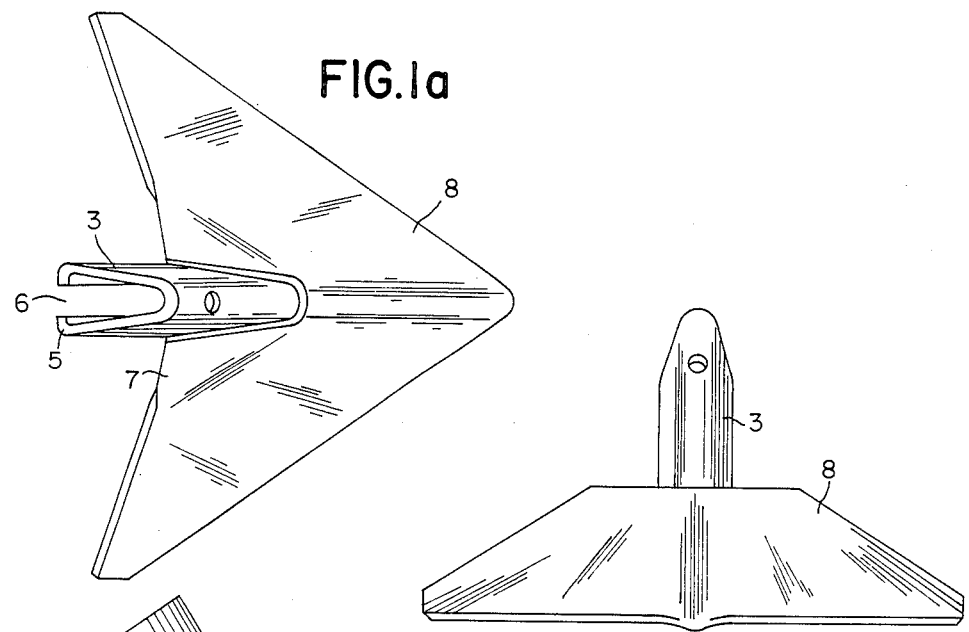
FIG.1a
FIG.1b
FIG.1c
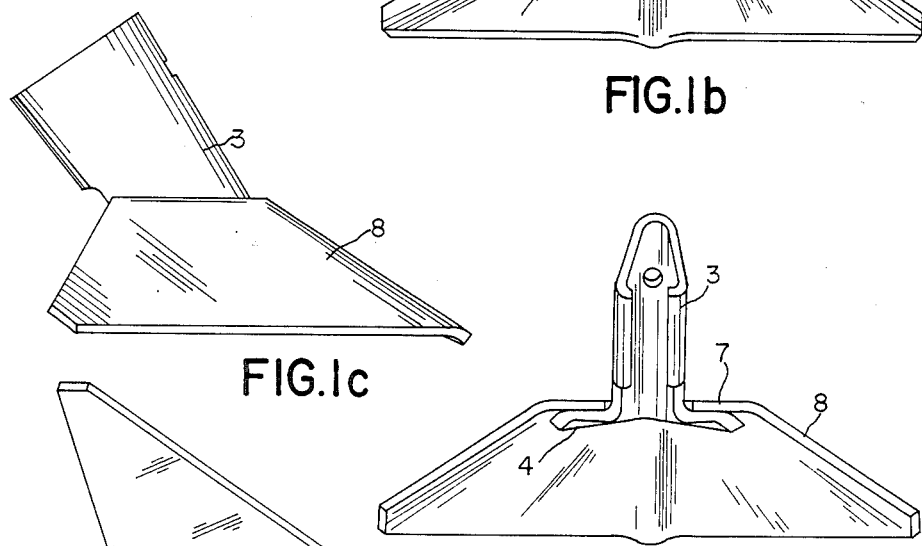
FIG.1d
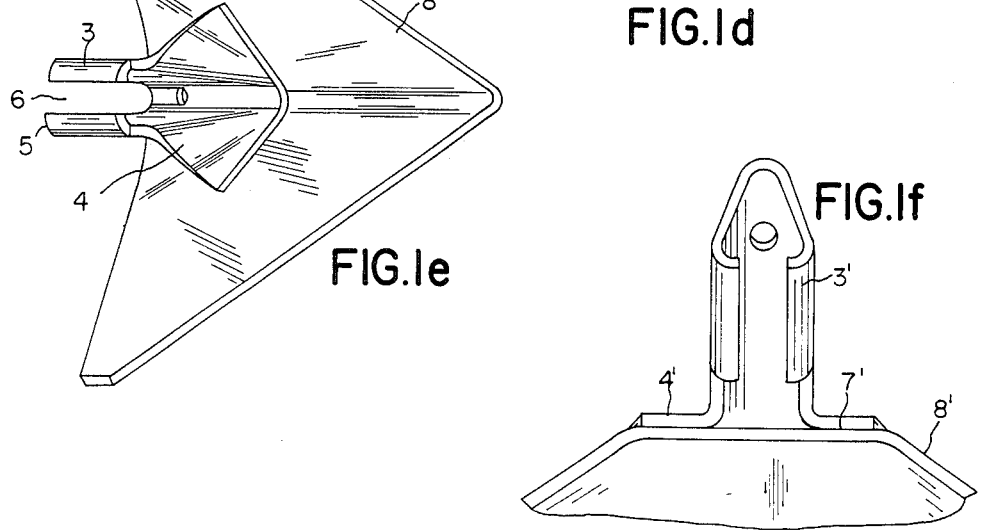
FIG.1e
FIG.1f

TWO-PIECE EARTH ENGAGING IMPLEMENT AND METHOD OF FORMING THE SAME

This application is a continuation-in-part of application Ser. No. 637,339, filed Aug. 3, 1984, now abandoned, which is a continuation of Ser. No. 217,170 filed Dec. 16, 1980, now abandoned.

This invention relates to earth engaging tools of the kind which are fitted to tines of agricultural machines.

Conventional shares and sweeps used as earth engaging tools are adapted to be bolted to the tines. This means that considerable labor is involved in removing worn shares or sweeps and replacing them. An example of such sweeps which are bolted to tines is shown in U.S. Pat. No. 1,499,531—Hoeregott. Further the attachment shafts and the tines are conventionally of wide profile (partly due to the presence of bolts extending through them) and these wide shafts and tines accumulate a projection of earth when being forced through the soil during cultivation. An example of a wide profile shaft or attachment portion is shown in U.S. Pat. No. 594,528—Griffiths. This forward agglomeration of soil inhibits the implements forward progress and for a large agricultural machine carrying numerous implements the extra energy and horsepower of the towing vehicle required is significant.

A problem encountered in the manufacture of shares and sweeps is that there is a significant wastage of metal due to the presence of the shaft which projects beyond the main portion of the shares or sweeps. This means that in forming the shares or sweeps in one piece from metal plate a relatively large portion of the metal plate is wasted because the blanked implement shapes do not lend themselves to nesting arrangements due to the presence of the large projecting shafts.

The present invention provides earth engaging implements of a design which overcomes each of the above problems.

To this end the present invention provides a non-integral earth engaging implement comprising an earth engaging portion, a shaft or socket portion secured to the rear of said earth engaging portion and sloping upwardly from said earth engaging portion, said shaft portion being of narrow width transverse to the direction of travel of said implement and incorporating a tapered recess adapted to receive a complementary shaped tine of an agricultural machine.

The narrow width of the shaft is selected by forming the shaft from metal plate which is bent about itself to form in cross section a triangular recess the height of which is large relative to the base and the recess being tapered such that the height of the triangular cross section decreases toward the lower end of the shaft. Ideally the lower end of the shaft is secured to the earth engaging portion of the implement such that the apex of the triangular cross section aligns with the direction of travel of the implement. Because the shaft is wedge shaped no soil can accumulate forwardly of the shaft when the implement is in use. In contrast to the prior art shares and sweeps for large agricultural machines, towing tractors of significantly lower horse power can be used to propel the array of shares or sweeps through the soil.

A further advantage of this invention is that no bolts are required to secure the implement to the tine. Because of the downward taper of the shaft recess and the complementary taper of the tine foot all stress on the implement during soil working forces the sweep or share more tightly onto the tine.

A significant advantage of the present invention is the saving of material in the manufacture of the implements. The shares and sweeps can be made from triangular blanks on chevron-shaped blanks which can easily be cut from sheet metal stock with little wastage. The shafts can similarly be made from rectangular blanks formed from sheet stock again with no material wastage. Further as the earth engaging portions are most subject to soil wear the shafts can be formed from thinner gauge sheet metal. Thus significant material cost savings can be obtained from the present invention.

The earth engaging portion includes a substantially planar central section and a blade portion extending from the central section at an angle thereto and facing in the forward direction of travel of the implement. This is in contrast to prior art implemnts wherein the earth engaging portion is merely a flat plate, for example as shown in U.S. Pat. No. 576,615—Roesch.

Preferably the shaft is formed with flanges on its lower end which flanges can be welded or riveted to complementary flanges on the rear of the earth engaging portion of the implements.

Three embodiments of this invention are shown in FIGS. 1(a) to (e), FIGS. 2(a) to 2(e), and FIGS. 3(a) and 3(b) of the drawings.

FIGS. 1(a) to (e) illustrate a share or cultivating point and FIGS. 2(a) to (e) illustrate a sweep.

Figure 2B:
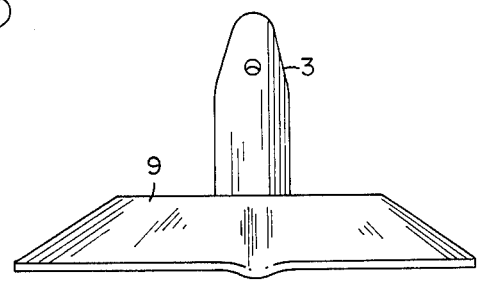
Figure 2C:
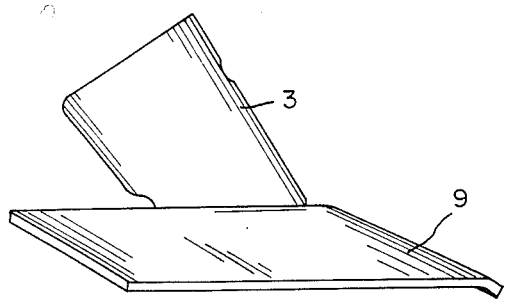
Figure 2D:
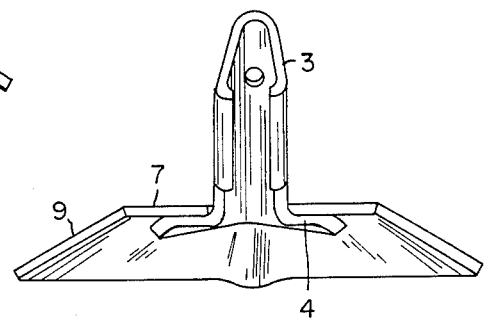
Figure 2E:
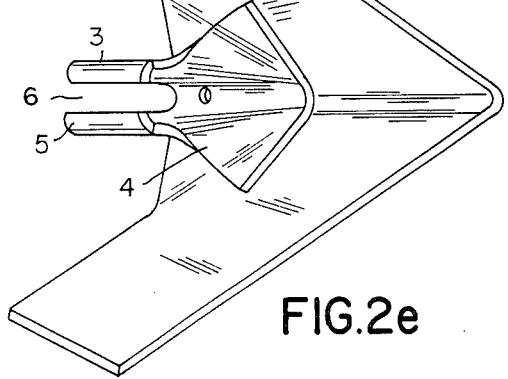
Figure 2F:
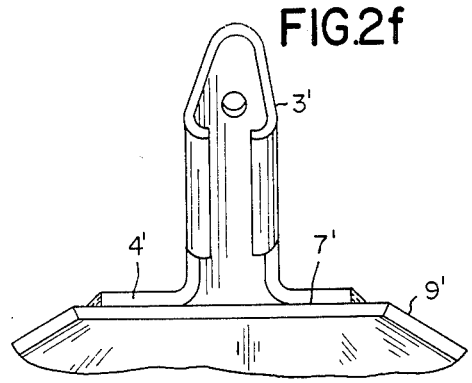
Figure 3A:
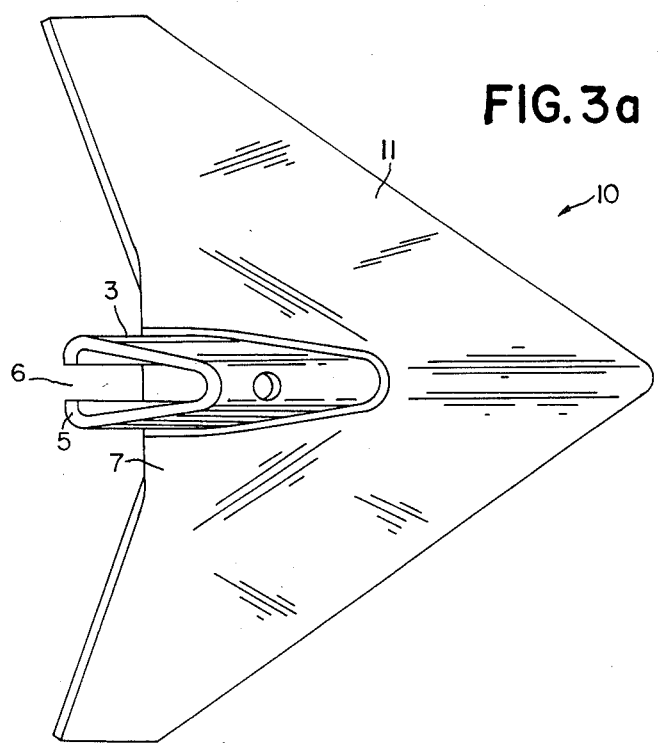
Figure 3B:
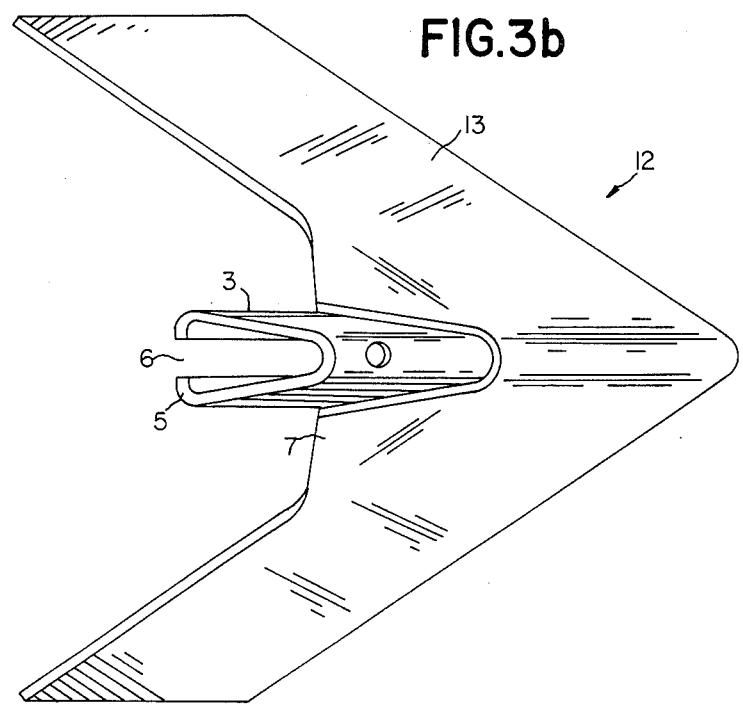

In particular, FIG. 1a is a top plan view of the implement according to one embodiment of the invention, FIG. 1b is a front elevational view thereof, FIG. 1c is a side elevational view thereof, FIG. 1d is a rear elevational view thereof, FIG. 1e is a bottom plan view thereof, and FIG. 1f is a fragmentary rear elevational view showing an alternative manner of attaching the socket. FIG. 2a is a top plan view of the implement according to another embodiment of the invention, FIG. 2b is a front elevational view thereof, FIG. 2c is a side elevational view thereof, FIG. 2d is a rear elevational view thereof, FIG. 2e is a bottom plan view thereof, and FIG. 2f is a fragmentary rear elevational view showing an alternative manner of attaching the socket. FIG. 3a is a top plan view of an implement similar to that of FIG. 1a wherein the earth engaging portion is formed from a chevron-shaped blank. FIG. 3b is a top plan view of an implement similar to that of FIG. 2a wherein the earth engaging portion is formed from a chevron-shaped blank.

In each case the implement comprises a shaft socket 3 with base flanges 4 and vertical flanges 5. The shaft incorporates a tapered recess 6 into which the foot of a tine is designed to seat. In order to present a narrow profile in the forward direction the shaft 3 is also tapered in cross section toward the apex of share blade 8 or sweep blade 9.

The base flange 4 of the shaft 3 underlies the flanges 7 of the share blade 8 or sweep blade 9 and the shaft is welded to the share or sweep blade at these points as shown in FIGS. 1d and 2d. Alternatively, socket 3' is welded to earth engaging portion 8' and 9' with the flanges 4' of socket 3' positioned on the upper surface 7' of portion 8' and 9' as shown in FIGS. 1f and 2f. In either case, the substantially planar central section of the earth engaging portion facilitates welding of the socket flanges thereto.

As mentioned above the shaft can be formed from a rectangular blank by conventional metal forming techniques. Similarly the share blade 8 and the sweep blade 9 can also be formed by conventional techniques from triangular blanks with a minimal wastage of material. Alternatively share blade 8 and sweep blade 9 can be formed from chevron-shaped blanks. This enables the point of one blank to nest in the vee of the preceeding blank, rather than the blank being a full triangle from which the vee portion must be removed. FIG. 3a shows an implement similar to that of FIG. 1a and generally designated 10 wherein the earth engaging portion 11 is formed from a chevron-shaped blank. FIG. 3b shows an implement similar to that of FIG. 2a and generally designated 12 wherein the earth engaging portion 13 is formed from a chevron-shaped blank.

Because of the downward taper of the shaft no securing bolts are required to retain the sweep or share on the tine. Also because of the narrow profile of the shaft less force is required, to move the implements through the soil, than with conventional shafts which are wider in profile.

Another significant advantage which arises out of the provision of a two piece implement is that the angle of shaft relative to the blade can be closer to perpendicular than in one piece implements. This is significant where a "stump jump" release mechanism is used. When the implement strikes an obstacle the tine swings backwards and as the obstacle is cleared the tine returns to its earth engaging position. If the implement is not bolted and if the implement does not strike the soil on the return of the tine, there is a possibility in prior art implements that the implement would be flung off the tine. In the present invention however when the tine recoils and the implement reaches the end of the swing the momentum of the implement is horizontal whereas the frictional force holding the share to the tine is predominantly of vertical orientation in contrast of the prior art. Thus the present invention ensures more satisfactorily that accidental loss of non-bolted tines cannot occur.

Thus in summary it can be seen that the present invention provides earth engaging implements which are easy to assemble onto tines, are less expensive to manufacture and are energy saving.

The claims defining the invention are as follows:

I claim:

1. A two-piece earth engaging deep tillage implement comprising an earth engaging portion formed from a metal blank and having a substantially planar central section and a blade portion extending from said central section at an angle thereto and facing in the forward direction of travel of said implement, said central section terminating in a rear edge extending transverse to the direction of travel of said implement, a socket portion formed from a rectangular metal blank and having a lower end secured to said central section of said earth engaging portion forwardly of said rear edge and sloping upwardly from said earth engaging portion and terminating in an upper end, said socket portion being generally triangular in cross section with the dimension from the apex to the base of the triangular cross-section being oriented front-to-rear with respect to and aligned with the forward direction of travel of the implement, said front-to-rear dimension of said generally triangular cross-section being relatively larger than the base thereof, said front-to-rear dimension decreasing in magnitude from said upper end toward said lower end of said socket portion, the lower end of said socket portion having outwardly extending flanges, said flanges being secured to said earth engaging portion to provide the securement of said socket portion to said earth engaging portion, said socket portion being of narrow width transverse to the direction of travel of said implement so as to present a narrow profile to earth through which it moves and to have reduced draft, said socket portion incorporating a recess beginning at said upper end and extending toward said lower end, said recess tapering in cross section from said upper end of the socket portion toward said lower end of said socket portion, said recess cross section being smaller at said lower end than at said upper end, said tapering terminating at the upper surface of said earth engaging portion, said recess being adapted to receive a complementary shaped foot of a tine of an agricultural machine for fastening said socket portion to said tine exclusively by friction.

2. An earth engaging implement as claimed in claim 1, wherein said socket shaft portion is of thinner gauge than said earth engaging portion.

3. An earth engaging implement as claimed in claim 1, wherein a slot is formed in said central section of said earth engaging portion and extending inwardly from said rear edge thereof and wherein said socket lower end is received in said slot with the outwardly extending flanges underlying and secured to the portions of said central section adjacent said slot.

4. An earth engaging implement as claimed in claim 1 wherein said earth engaging portion is formed from a triangular metal blank.

5. An earth engaging implement as claimed in claim 1 wherein said earth engaging portion is formed from a chevron-shaped metal blank.

6. An earth engaging implement as claimed in claim 1 wherein said central section of said earth engaging portion has an outer surface and wherein said socket portion lower end outwardly extending flanges are secured to said outer surface of said central section.

7. A method of forming an earth engaging deep tillage implement comprising the steps of blanking an earth engaging portion from metal plate, said earth engaging portion having a substantially planar central section and a blade portion extending from said central section at an angle thereto and facing in the forward direction of travel of said implement, said central section terminating in a rear edge extending transverse to the direction of travel of said implement, blanking a triangular socket portion from metal plate, forming said earth engaging portion into its three dimensional form, bending said rectangular portion about itself to form a hollow socket portion, shaping said socket portion to have a generally triangular cross section with the dimension from the apex to the base of the triangular cross section being oriented front-to-rear and aligned with the forward direction of travel of the implement, said front-to-rear dimension of said generally triangular cross section being relatively larger than the base thereof, said front-to-rear dimension decreasing in magnitude from said upper end toward said lower end of said socket portion, said socket portion having a narrow width transverse to the direction of travel of said implement so as to present a narrow profile to earth through which it travels and to have reduced draft, the lower end of said socket portion having outwardly extending flanges formed thereon, subsequently joining the lower end of said socket portion to said central section of said earth engaging portion forwardly of said rear edge by securing said flanges to said earth engaging portion.

8. A method as claimed in claim 7, wherein a rectangular blank of thinner gauge material than the triangular blank is used for said socket portion.

9. A method as claimed in claim 7, wherein said step of blanking comprises forming a slot in said central section of said earth engaging portion and extending inwardly from said rear edge thereof, and wherein said step of joining includes placing the smaller end of said socket portion in said slot with said flanges underlying the portions of said central section adjacent said slot.

10. A method as claimed in claim 7, wherein said earth engaging portion is formed from a triangular metal blank.

11. A method as claimed in claim 7, wherein said earth engaging portion is formed from a chevron-shaped metal blank.

12. A method as claimed in claim 7, wherein said central section of said earth engaging portion has an outer surface, and wherein said step of joining includes placing said flanges on said outer surface of said central section.

* * * * *